US011673044B1

(12) United States Patent
Minton et al.

(10) Patent No.: US 11,673,044 B1
(45) Date of Patent: Jun. 13, 2023

(54) CONTEXTUAL RECOMMENDATIONS IN MEDIA STREAMING

(71) Applicant: Amazon Technologies, Inc., Seattle, WA (US)

(72) Inventors: Michael Glenn Minton, Redmond, WA (US); Ken Llewellyn Demarest, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/610,405

(22) Filed: May 31, 2017

(51) Int. Cl.
*A63F 13/335* (2014.01)
*H04N 21/478* (2011.01)
*H04N 21/45* (2011.01)
*H04N 21/466* (2011.01)
*H04N 21/84* (2011.01)
*A63F 13/79* (2014.01)

(52) U.S. Cl.
CPC ........... *A63F 13/335* (2014.09); *A63F 13/79* (2014.09); *H04N 21/4532* (2013.01); *H04N 21/4668* (2013.01); *H04N 21/4781* (2013.01); *H04N 21/84* (2013.01); *A63F 2300/5546* (2013.01)

(58) Field of Classification Search
CPC .......... A63F 13/60; A63F 13/69; A63F 13/80; A63F 13/79; H04N 21/4532; H04N 21/4668; H04N 21/4781; H04N 21/84
See application file for complete search history.

(56) References Cited

U.S. PATENT DOCUMENTS

| 2015/0121431 | A1* | 4/2015 | Jacoby | H04N 21/251 725/59 |
| 2015/0382079 | A1* | 12/2015 | Lister | H04N 21/2187 725/38 |
| 2016/0182924 | A1* | 6/2016 | Todd | H04N 5/45 725/116 |
| 2018/0242045 | A1* | 8/2018 | Greenstein | G06F 16/735 |

* cited by examiner

Primary Examiner — Yingchuan Zhang
(74) Attorney, Agent, or Firm — Knobbe, Martens, Olson & Bear LLP

(57) ABSTRACT

A system and method for providing contextual recommendations in gaming media streams. One or more users request a gaming media stream broadcast corresponding to game play. A broadcast service obtains the gaming media stream that includes a gaming stream identifier and user identifier. The broadcast service can generate a set of recommendations based on at least one of social network information, historical information, and identification of events and items in the gaming media stream. The broadcast service provides the gaming media stream with one or more recommended items.

20 Claims, 9 Drawing Sheets

CONTEXTUAL RECOMMENDATIONS IN MEDIA STREAMING

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, client computing devices may interact with data center resources in an interactive format, such as game play. In such embodiments, one or more additional client computing devices may request access to the game play media stream.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
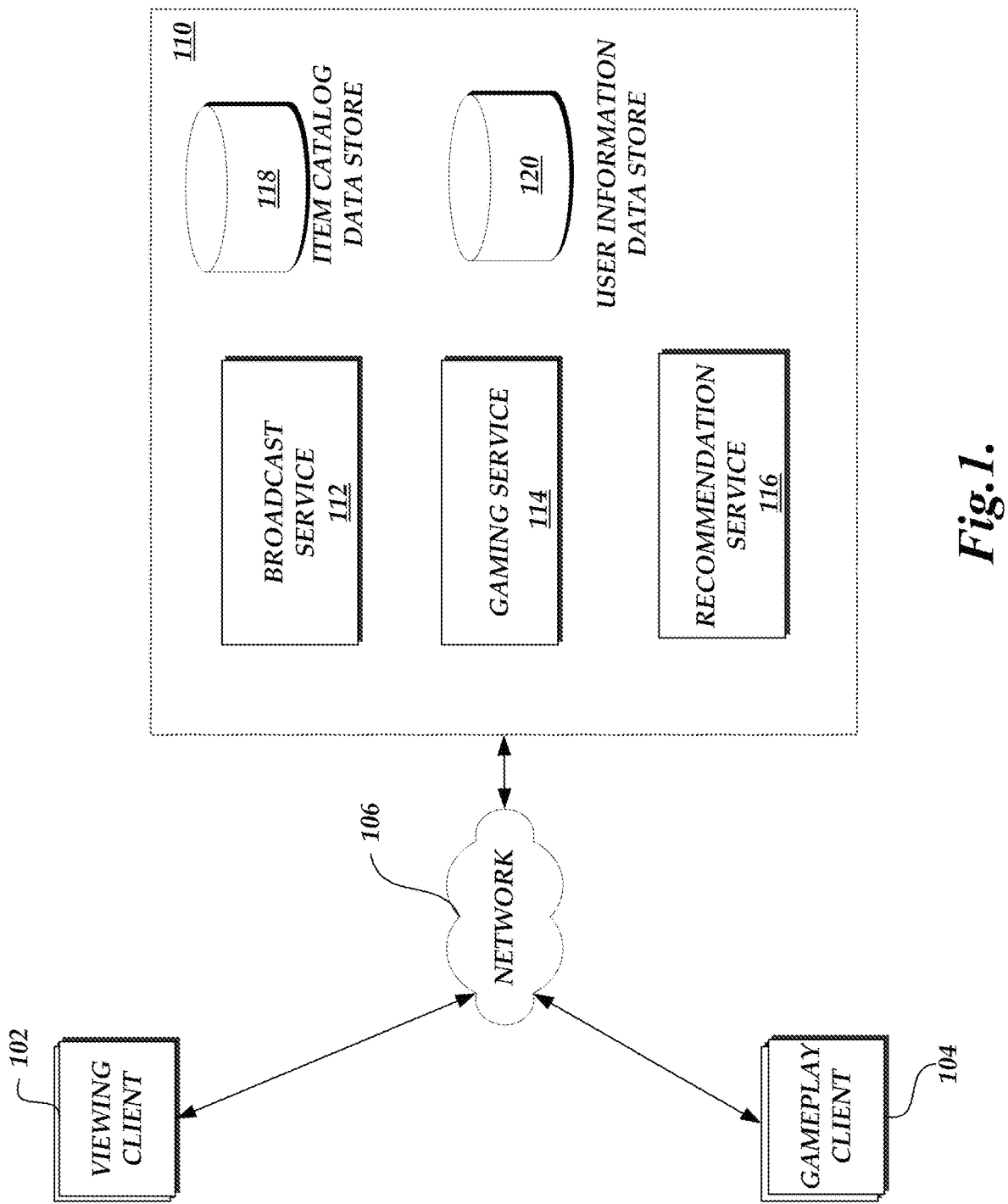
FIG. 1 is a block diagram depicting an illustrative logical network including multiple client computing devices and a service provider network.

Generally described, the present application corresponds to the generating of media streams corresponding to gaming content. More specifically, aspects of the present application relate to the processing of requests to providing gaming content with contextual recommendations. Illustratively, one or more client computing devices can utilize a browser application or browsing application functionality to request gaming content provided by a broadcast service via a communication network. Illustratively, in one embodiment, the gaming content is generated by a third-party interaction with a gaming service that results in the generation of a gaming media stream. The request for the gaming content can include one or more identifiers that are used to determine the requested gaming stream and one or more identifiers that can be utilized to determine characteristics of the requesting user.

Illustratively, the broadcast service generates a set of recommended items to provide with the requested gaming stream based on different sources. In one aspect, the broadcast service can utilize personalization information associated with the requesting user, including, but not limited to, social network information and historical information. For example, the broadcast service can identify one or more items associated with individuals in the requesting user's social network to use as seed items for a recommendation service or as the recommended item. In another example, the broadcast service can identify one or more items from the requesting user's historical information to use as a seed item, such as items in the user's previous purchase history, wish list, browsing history, and the like. In another aspect, the broadcast service can utilize information associated with the gaming stream to use as seed items for the recommendation service or as the recommended item. For example, the broadcast service can utilize meta-data included in the gaming stream that identifies items or events occurring in the gaming stream. In another example, the broadcast service can utilize a processing engine to process the gaming stream information to recognize items or events occurring the gaming stream in conjunction with, or independent from, meta-data.

Illustratively, the broadcast service can further process a full set of recommended items to generate a subset of items to be provided to the requesting user in conjunction with the requested gaming stream. For example, the broadcast service can prioritize dynamically appearing items that occur in the gaming stream information. In another example, the broadcast service can prioritize items that are identified in multiple ways, such as items occurring in recommendations from the personalization information and gaming stream information. In still a further example, the broadcast service can filter the set of recommended items to eliminate items that do not occur in the gaming media stream or determined to be not readily associated with the gaming stream.

Based on the processed set of recommendations, the broadcast service can then generate individual responsive user interfaces to respective requesting users that include the gaming stream from the gaming service and one or more recommended items. In one embodiment, the recommended items are specific to individual users and can be provided to respective, requesting users such that individual requesting users can select recommended item to be included in game play by the requesting user (or another user). For example, if the recommended item corresponds to a feature or item available in game play, the requesting user can select the item/feature and the item/feature will be made available to the requesting user during a subsequent game play session involving the requesting user. In another embodiment, the recommended items can be provided for selection and processed in accordance with interactions, such as purchase, rental/lease, additional to wish lists, and the like. Additionally, in embodiments in which there are multiple requesting users requesting the same gaming media stream data, the broadcast service can provide multiple, individual responses in which at least some portion of the recommended items are unique to the individual requestor, as described above.

Although aspects of some embodiments described in the disclosure will focus, for the purpose of illustration, on the illustrative interactions for requesting browser content and illustrative screen displays, one skilled in the relevant art will appreciate that the examples are illustrative only and are not intended to be limiting.

FIG. 1 is a block diagram depicting an illustrative logical network 100 including multiple viewing client computing devices 102, multiple gameplay client computing devices 104, and a service provider system 110 in communication via a network 106. While the viewing client computing devices 102 and gameplay client computing devices 104 are shown as a group within FIG. 1, the client computing devices 102 and gameplay client computing devices 104 may be geographically distant, and independently owned or operated. Likewise, although the client computing devices 102 and gameplay client computing devices 104 are logically represented as separate devices, one or more computing devices can function as client computing devices 102 and gameplay client computing devices 104. Accordingly, the groupings of client computing devices 102 and gameplay client computing devices 104 within FIG. 1 is intended to represent a logical, rather than physical, grouping. Similarly, while one set of illustrative components is shown to represent the service provider system 110, multiple instances of each component may be present within the service provider system 110, and such components may be located within geographically diverse areas (e.g., globally, continentally, or regionally), in order to provide a wide geographical presence for the service provider system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, gameplay client computing devices 104 and the service provider system 110 is depicted as having a single connection to the network 106, individual components of the client computing devices 102 and gameplay client computing devices 104, and service provider system 110 may be connected to the network 106 at disparate points.

Client computing devices 102 and gameplay client computing devices 104, generally "client computing devices" may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device may include one or more data stores (not shown in FIG. 1) including various applications or computer-executable instructions, such as web browsers, used to implement the embodiments disclosed herein. An illustrative example of a viewing client computing device 102 will be described with regard to FIG. 3

In accordance with embodiments, the service provider system 110 includes a set of services for implementing one or more aspects of the present application. As described in further detail below, the service provider system 110 can include one or more computing devices for implementing a broadcast service 112. Illustratively, the broadcast service 112 can process requests for game play stream from viewing client devices 102, which can include a requested game play stream and one or more recommended items, as described below. The service provider system 110 can also include one or more computing devices for implementing a game service 114. Illustratively, the gaming service 114 can host one or more interactive games with gameplay client computing devices 104 to generate a resulting game play media stream that can be provided to client computing devices 102 (via the broadcast service 112) and gameplay client computing devices 104. The service provider system 110 can further include one or more computing devices for implementing a recommendation service 116 utilized by the broadcast service 112 to generate a set of recommended items based on personalization information or information obtained from gaming streams.

As further illustrated in FIG. 1, the service provider system 110 can include an item catalog data store 118 that maintains information related to one or more items that can be recommended to requesting users, one or more items that can be identified in gaming media streams, or a combination thereof. The service provider system 110 can also include a user information data store 120 that corresponds generally to one or more data stores for maintaining personalization information related to user social network networks, purchase histories, browsing history, preferences, and the like. Additionally, the user information data store 120 can maintain profile information associated with the identification and validation of users, such as account data, passwords, financial or transaction information, biographical information and the like. Generally, the item catalog data store 118 and user information data store 120 represent one or more data stores that can provide or maintain information related to one or more aspects of the present application.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting broadcast service 112, the gaming service 114, and the recommendation service 116 may be executed by one more virtual machines implemented in a hosted computing environment. Additionally, item catalog data store 118 and the user information data store 120 may correspond to multiple physical or virtual computing resources that may logically represented as a single component, but may be implement in a distributed manner. Still further, although the service provider system 110 is depicted as hosting the stand-alone services (e.g., the broadcast service 112, the gaming service 114, and the recommendation service 116), the implementation of any of the identified services may be in conjunction with other services provided by, or associated with, the service provider system 110. Likewise, one or more services or data stores may be associated with additional third parties.

Figure 2:
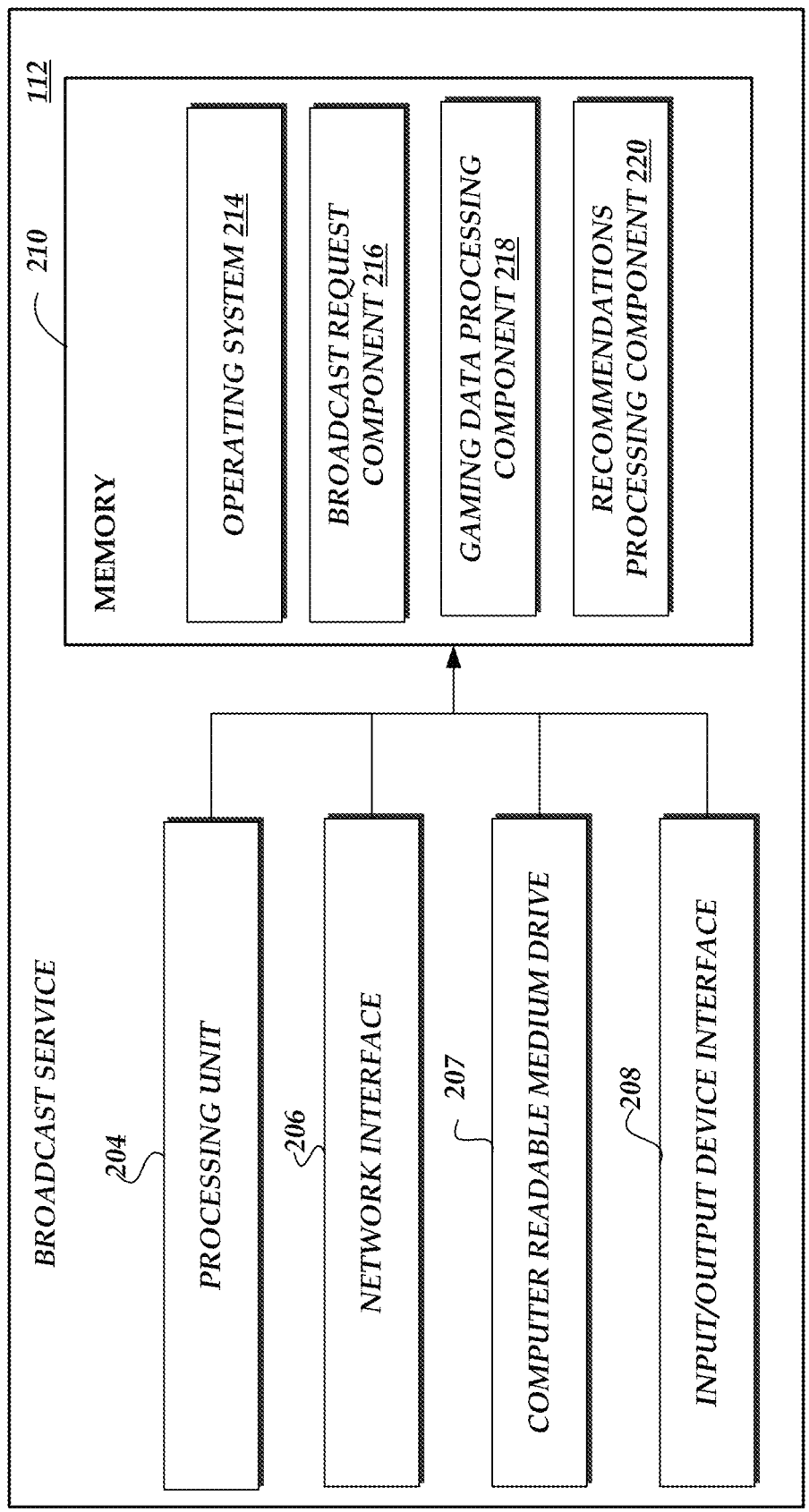
FIG. 2 is a block diagram of illustrative components of a broadcast service for providing gaming media streams in accordance with the present application.

FIG. 2 depicts one embodiment of an architecture of a computing device illustrative of a broadcast service 112 that receives and processes requests from viewing client computing devices 102 in accordance with the present application. The general architecture of the computing device for implementing the broadcast service 112 depicted in FIG. 2 includes an arrangement of computer hardware and software components that may be used to implement aspects of the present disclosure. As previously described, one or more aspects of the broadcast service 112 may be implemented in a virtualize environment provided by a hosting environment. As illustrated, the computing device includes a processing unit 204, a network interface 206, a computer readable medium drive 207, an input/output device interface 208 (which may be omitted), all of which may communicate with one another by way of a communication bus.

The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the computing device. The memory 210 may further include computer program instructions and other information for implementing aspects of the present disclosure. For example, in one embodiment, the memory 210 includes a broadcast request processing component 216 that can interface with a corresponding browsing component on the viewing client computing device 102 to receive requests for gaming stream information. Illustratively, the broadcast request processing component 216 can interface with the gaming service 114 to request and receive gaming media stream data. Additionally, in some embodiments, the memory 210 can include a gaming media processing service 218 to process incoming gaming media stream data and analyze the gaming media stream data to determine one or more items or events associated with the gaming media stream, as described in various parts herein. Still further, the memory can include a recommendations component 220 to process personalization data or gaming stream data to generate a set of recommendations for a requesting user. Each of the components associated with the broadcast service 112 may implement the functionality or function to interface with additional or external components to implement the related function.

Figure 3:
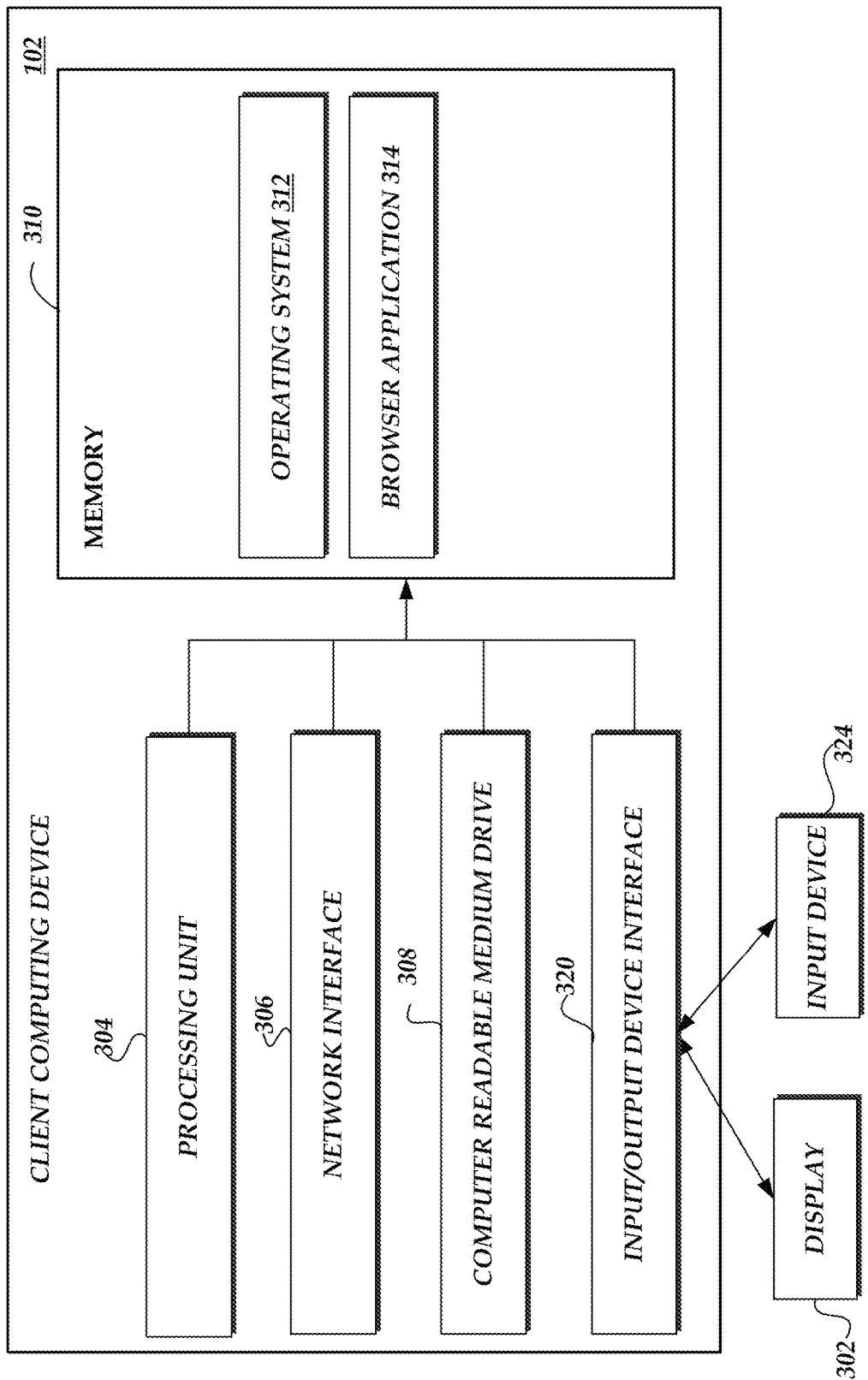
FIG. 3 is a block diagram of illustrative components of a client computing device for processing content in accordance with the present application.

FIG. 3 depicts one embodiment of an architecture of an illustrative a client computing, illustratively viewing client computing device 102, that can generate requests for gaming media streams in accordance with the present application. The general architecture of the viewing client computing device 102 depicted in FIG. 3 includes an arrangement of computer hardware and software components that may be used to implement aspects of the present disclosure. As illustrated, the viewing client computing device 102 includes a processing unit 304, a network interface 306, a computer readable medium drive 308, an input/output device interface 320, one or more output devices 322 (e.g., a display), and one or more input devices 324 (e.g., keyboard or touch screen), all of which may communicate with one another by way of a communication bus. The network interface 306 may provide connectivity to one or more networks or computing systems, such as the network 106 of FIG. 1. The processing unit 304 may thus receive information and instructions from other computing systems or services via a network.

The memory 310 may include computer program instructions that the processing unit 304 executes in order to implement one or more embodiments. The memory 310 generally includes RAM, ROM, or other persistent or non-transitory memory. The memory 310 may store an operating system 312 that provides computer program instructions for use by the processing unit 304 in the general administration and operation of the viewing client computing device 102. The memory 310 may further include computer program instructions and other information for implementing aspects of the present disclosure. For example, in one embodiment, the memory 310 includes a browser application 314, or other software application, for accessing content and communicating with and processing information from the broadcast service 112. One skilled in the relevant art will appreciate that gameplay client computing device 104 could implement a similar architecture to interact with the gaming service 114.

Figure 4A:
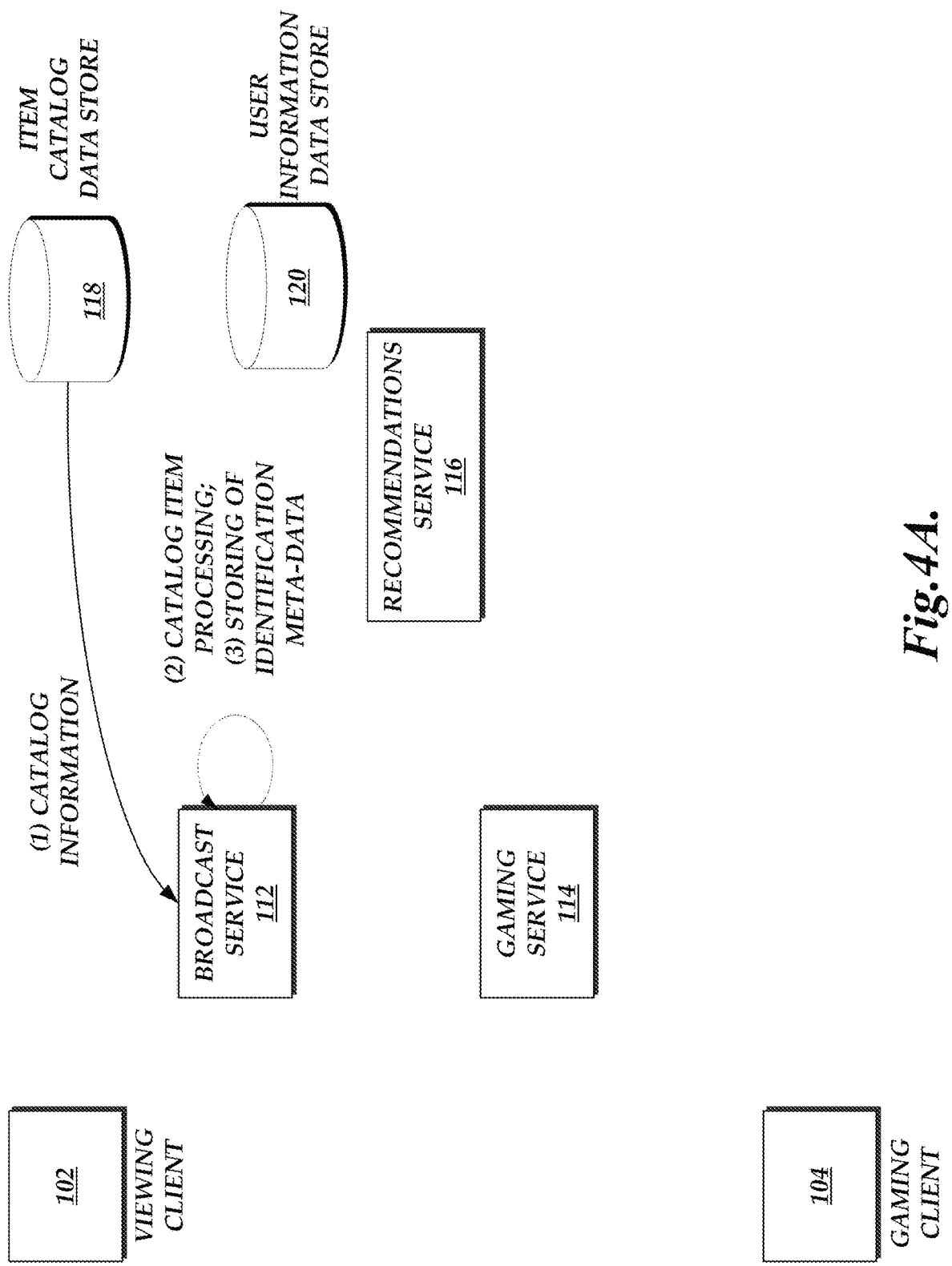
FIGS. 4A-4D are block diagrams of the logical network of FIG. 1 illustrating the requesting and processing game media streams in accordance with the present application.

Turning now to FIGS. 4A-4D, illustrative interactions between the components of the logical network 100 in processing requests for gaming media content will be described. With reference to FIG. 4A, illustrative interactions between the components of the logical network 100 prior to the transmission (or concurrent with the transmission) of gaming media stream data will be described. At (1), the broadcast service 112 can obtain catalog information, from the item catalog data store 118. Illustratively, the catalog information can correspond to one or more items or events that can be detected or otherwise determined from gaming media streams or meta-data associated with gaming media streams. The catalog information can be grouped or identified by items or events occurring in individual gaming media streams or types or category of gaming media streams (e.g., items or events unique to particular games or grouping of games). The catalog information can also be grouped or identified by items or events occurring generally in any (or a large subset) of gaming media streams (e.g., items or events occurring in a larger number of games).

At (2), the broadcast service 112, such as through the gaming stream processing component 218, processes the catalog information to determine one or more unique characteristics of the item or event data for subsequent identification. Illustratively, the broadcast service 112 can utilize various information associated with the catalog information, such as identifiable display attributes (e.g., size, shape, color, shading), timing information (e.g., duration or time of occurrence), associations (e.g., items relation or item associations), and the like to train a recognition engine to attempt to make an identification or potential identification in a gaming media stream. Illustratively, the identification does not have to be a positive identification, but can also include confidence values or error rates. For example, the broadcast service 112 can be trained to identify an event or item if there is a likelihood above a threshold that the identification is correct. At (3), the broadcast service 112 can generate and store information, such as meta-data that will be utilized in the recognition of items or events. Illustratively, the interaction of FIG. 4A can be repeated at various intervals or upon determination of one or more events, such as the addition of new games or the update of the catalog.

Figure 4B:
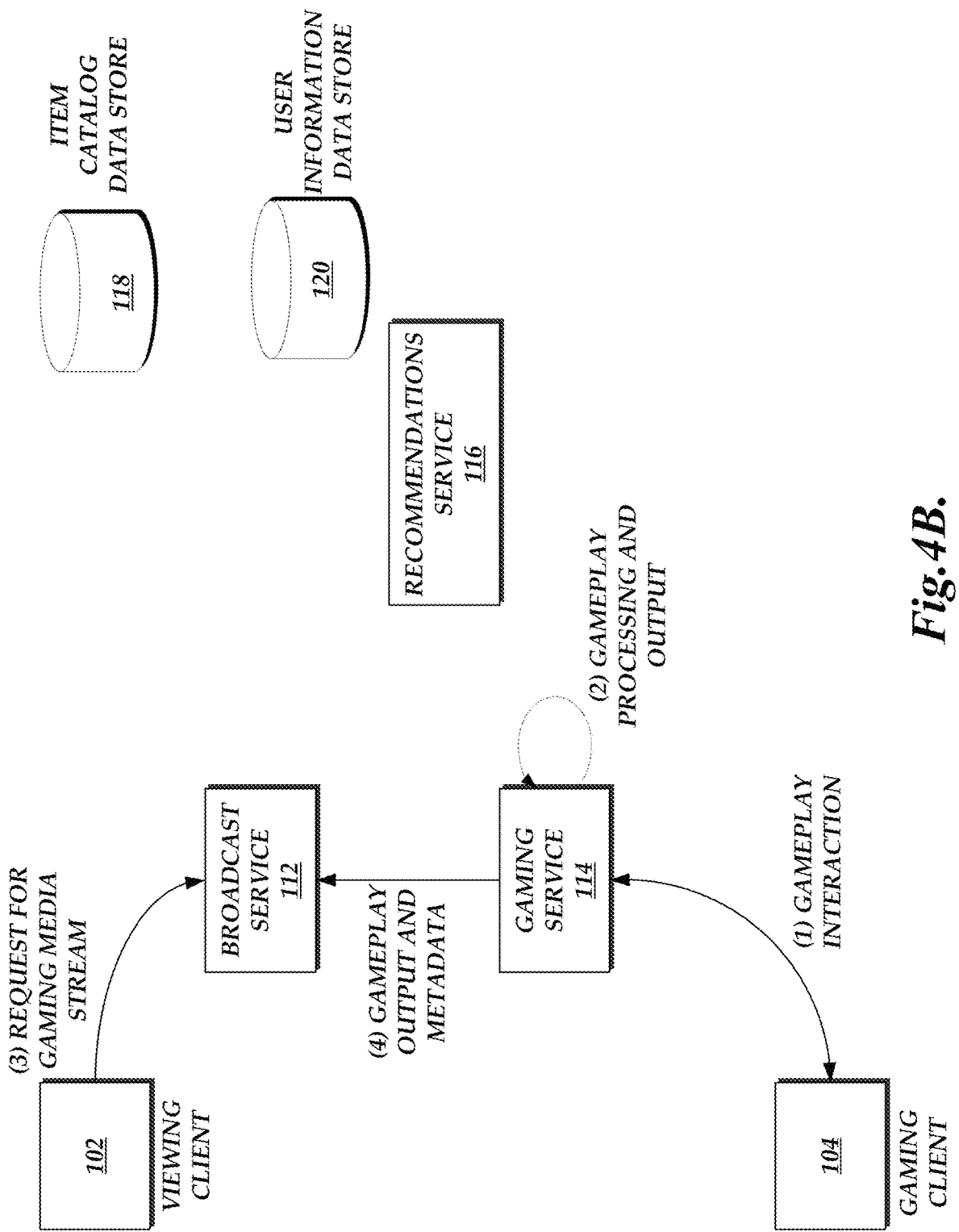

Turning now to FIG. 4B, illustrative interactions between the components of the logical network 100 with regard to the transmission and processing of requests for gaming media stream data will be described. For embodiments in which multiple viewing client devices 102 are requesting gaming media stream, at least some portion of the interaction illustrated in FIG. 4B would be repeated. Accordingly, FIG. 4B will be described with regard to a singular interaction between a viewing client 102 and the broadcast service 112, but should not be limited to such interaction. At (1), the gameplay client 104 and gaming service 114 exchange interaction corresponding to the play of one or more games or other interactive activity. At (2), the result of the exchange of gameplay interaction will cause the gaming service 114 to generate one or more gaming media streams that can be broadcast to the gameplay client computing device 104. Additionally, as will be described below, at least some portion of the gaming media stream will be provided (or made accessible) to the broadcast service 112 for transmission to one or more viewing client computing devices 102. Illustratively, the gaming media stream provided by the gaming service 114 can include video content for display by a computing device, such as a browser application or other software application. The gaming media stream can also include meta-data that is associated with the presentation of the gaming media. Example of meta data can include timing information regarding the generation of outputs on the client computing device, synchronization information for correlating additional video or audio outputs, presentation information regarding settings or preferences for the video or audio output, control information regarding how the gaming media stream may be manipulated by a computing device or individual user, security and authentication information and the like. Additionally, in one embodiment, the gaming media stream can include information utilized to identify items or events that are or will occur in the gaming media stream, such as the inclusion of specific, unique identifiers corresponding to the items or events. The meta-data can further include additional information regarding the items or events that can be identified in the gaming media stream, such as the duration of the display of the item or event, a weight, priority or importance of the item or other similar information.

At (3), one or more viewing client computing devices 102 transmit gaming media requests to the broadcast service 112. Illustratively, the viewing client computing devices 102 can utilize one or more interfaces, such as an interface generated on a browser software application, that allows users to request access to gaming media streams. The request can include information identifying the user of the viewing client computing devices 102, such as user identifiers, passwords or other personal information. The request can also include information that identifies the requested gaming media stream, such as identification of general search terms, identification of types of gaming media streams (e.g., an identification of a game), identification of specific instances of a game (e.g., identification of a game and a particular gaming user), identification of particular types of gameplay users independent of game, identification of specific gameplay users independent of game, and the like.

At (4), the gaming service 114 can provide the broadcast service 112 with or more gaming media streams. In one embodiment, the gaming service 114 can automatically provide the gaming media streams to the broadcast service 112 without specific requests. In another embodiment, the gaming service 114 can provide the gaming media streams based on requests or other triggering criteria associated with the broadcast service 112. For example, the broadcast service 112 can process the request from the viewing client computing devices 102 and generate a gaming identifier request to the gaming service 114. For purposes of the present application, the gaming service 114 provides the gaming stream to the broadcast service 112 in a timing sufficient for processing the gaming stream and including recommendations, as described herein.

Figure 4C:
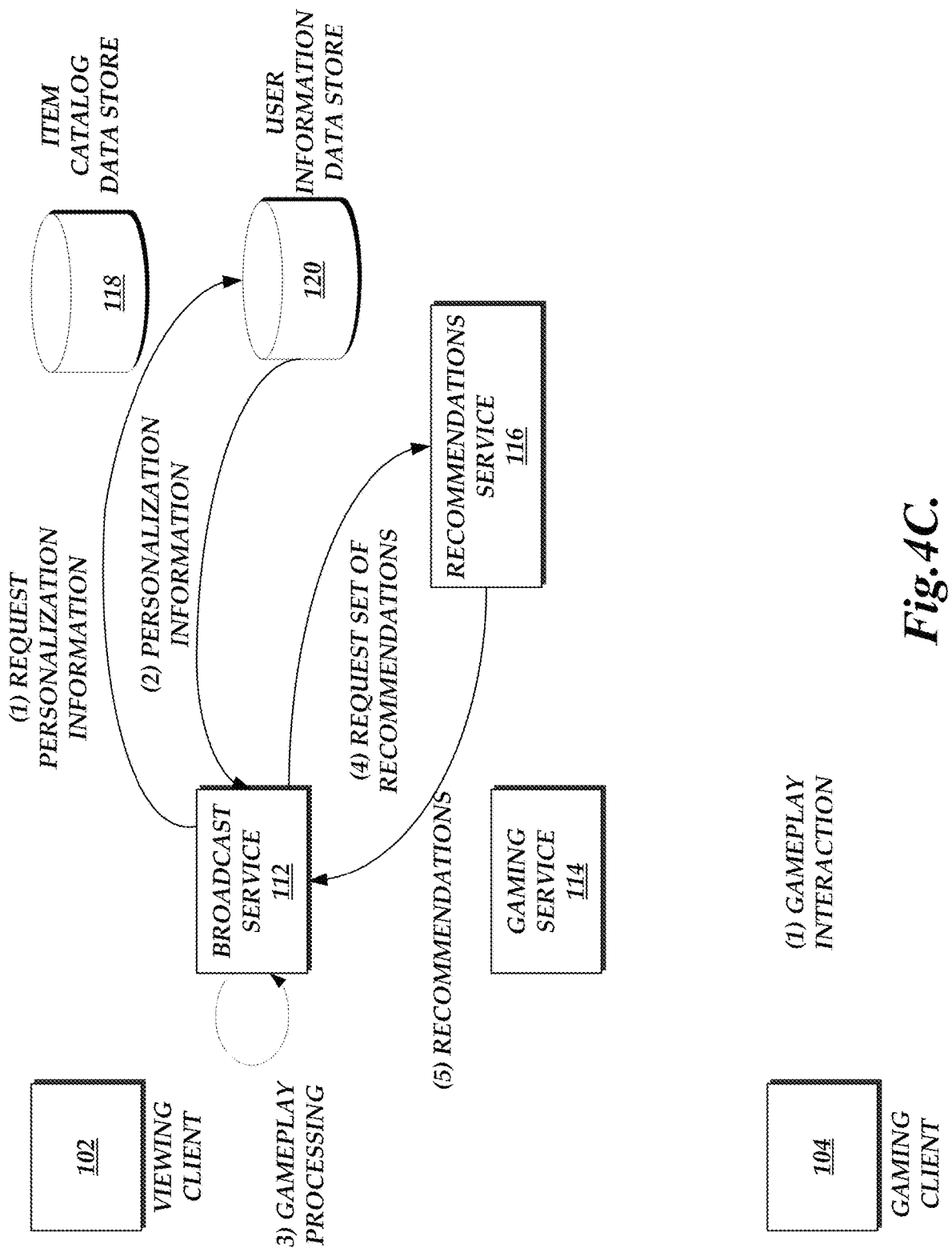

With reference now to FIG. 4C, illustrative interactions between the components of the logical network 100 for the generation of recommendations to be included in the broadcast of gaming media stream data will be described. At (1), the broadcast service 112 requests personalization information from the user information data store 120. At (2), the personalization information is returned to the broadcast service 112. The personalization information can include, but is not limited to, information related to previous purchase history for the identified user (e.g., the user of the viewing client computing device 102), previous browsing history information for the identified user, items previously identified or selected for the identified user, ratings or reviews for particular items or events, or other information related to an identified user and one or more previous interactions with the service provider network 110. The personalization information can further include information related to previous gaming media stream access including, but not limited to an identification of gaming media streams, selection or focus on particular characters or other items depicted in the gaming media stream, tracking a number of times a particular gaming media stream, or portion thereof, has been repeated, saved media clips, and the like. The personalization information can also include social network information related to one or more additional users that are associated with the identified user via a social network, such as social media application or social media networks. The associations can include users or individuals that have a form of designation (e.g., "friends"), tracked interactions, contextual matching, and the like. The associations can also identify social network interaction that has an association with the requested gaming media stream, such as keywords, titles, characters, results, players, and the like. Illustratively, the personalization information can include the identification of one or more items that can be recommended to the identified user for selection (e.g., purchase or use) or utilized as seed items for recommending additional items. In one example, an item previously purchased by the identified user can be recommended again if it is available for purchase additional times. In another example, the same item previously purchased by the identified user can be utilized to recommend items complimentary to the purchased item or otherwise contextually related.

At (3), the broadcast service 112 processes the gaming media streams to obtain additional item or event information. As discussed above, in one embodiment, the broadcast service 112 can process meta-data associated with the gaming media stream to obtain an identification of items or events occurring in the gaming media stream. For example, the broadcast service 112 can process the gaming media stream to obtain unique identifiers included in the gaming media stream meta-data. In another embodiment, the broadcast service 112 can utilize a gaming stream processing component 218 (or other service) to identify the items or events occurring in the gaming media stream. As described above, such a processing component can be trained in accordance with catalog information to facilitate the dynamic identification of items or events. The broadcast service 112 can further utilize additional resources, such as lookup tables or matrices that facilitate the identification of items or events. For example, one or more items may be associated with an event that is dynamically determined. As previously described, the one or more items determined from the gaming media streams can be recommended to the identified user for selection (e.g., purchase or use) or utilized as seed items for recommending additional items.

At (4), the broadcast service 112 transmits a request for recommendations from the recommendation service 116. In one embodiment, the broadcast service 112 can include an identification of the one or more seed items to find related or associated items, such as the identification of an event or item previously purchased by the identified user. In other embodiments, the broadcast service 112 can also include items that may be utilized as recommendations themselves and request additional items for recommendation. For example, if a particular weapon has been identified in the gaming media stream, the broadcast service 112 can indicate that the weapon will be recommended and request additional or complimentary items (e.g., a feature for increasing speed of the player to better utilize the recommended weapon). At (5), the recommendation service 116 provides a set of recommended items to the broadcast service.

At (6), the broadcast service 112 processes the set of recommended items. In one aspect, the broadcast service 112 can prioritize items for recommendation based on the source of the recommendation, such as items identified in the gaming media stream compared to items obtained from a social network. In another aspect, the broadcast service 112 can prioritize items that have been identified from multiple sources, such as recommended items generated from personalization information and gaming media information. In a further aspect, the broadcast service 112 can prioritize items based on financial criteria, organizational criteria or other business terms. For example, the broadcast service 112 can prioritize items associated with the game play publisher over third parties. In another aspect, the broadcast service 112 can filter items for recommendation. For example, the broadcast service 112 can filter items that are not associated directly with game play. In another example, the broadcast service 112 can filter items that have been previously recommended but not selected. In a further example, the broadcast service 112 can filter items that have been identified as redundant or duplicative of items associated with the identified user. One skilled in the relevant art will appreciate that a number of additional or alternative processing steps to refine the set of recommended items or sort the set of recommended items can be incorporated by the broadcast service 112.

Figure 4D:
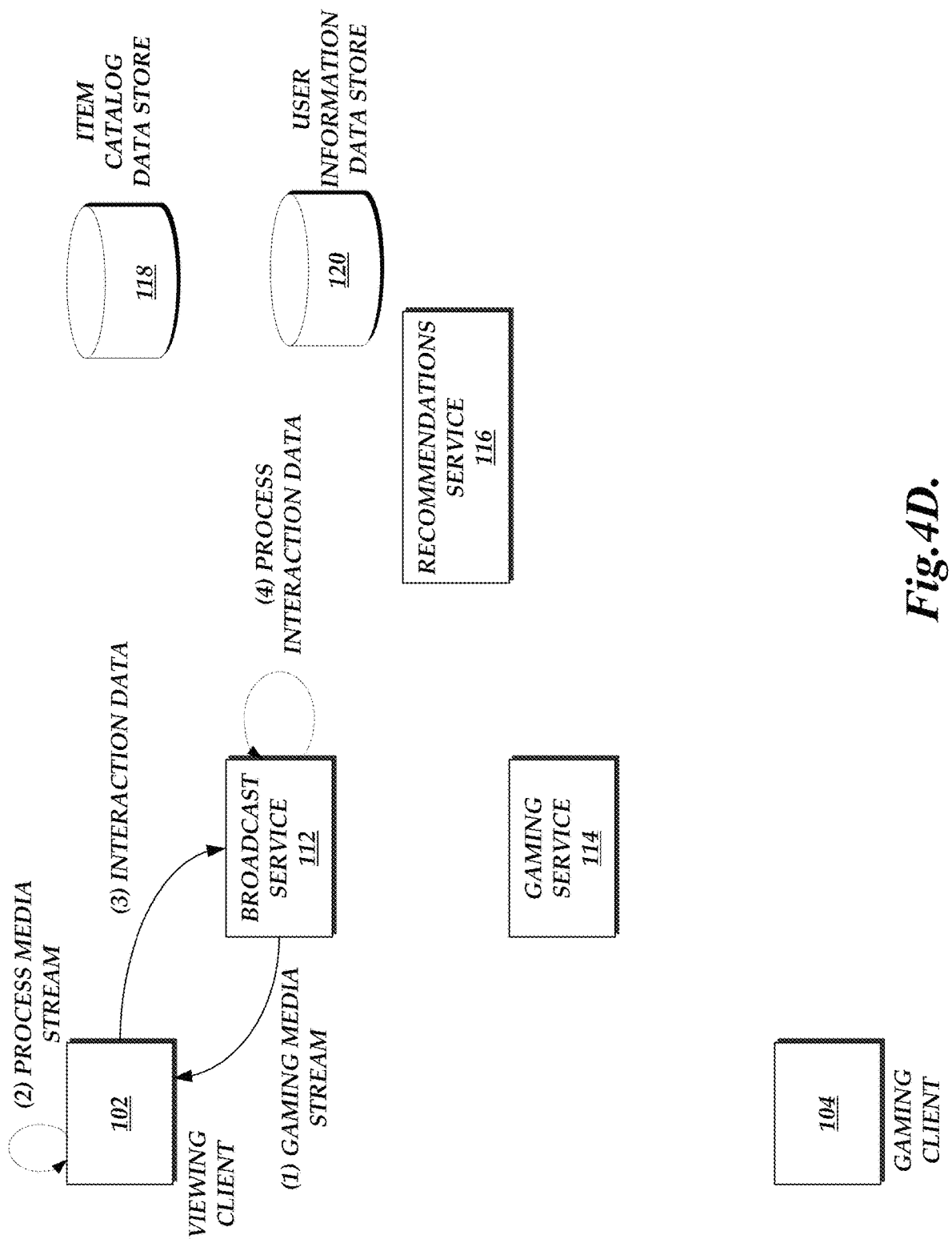

With reference now to FIG. 4D, illustrative interactions between the components of the logical network 100 for providing recommendations included in the broadcast of gaming media stream data will be described. At (1), the broadcast service 112 generates, or otherwise causes the generation of, a user interface that includes a requested gaming media stream and one or more recommended items. At (2), the viewing client computing device 102 obtains and processes the user interface to provide the gaming media stream to the requesting user. Illustratively, at (3), the viewing client computing device 102 can obtain additional interaction information from the requesting user. Such interaction can include selection of one or more recommended items. For example, a requesting user can select one or more recommended items to make the recommended items available for subsequent game play. At (4), the broadcast service 112 processes the user interaction. In one example, the broadcast service 112 can cause the selected item to be added to the profile of the requesting user for use in subsequent game play. In alternative embodiments, the broadcast service 112 can add selected items to other users, such as a user designated in the interaction data.

Figure 5:
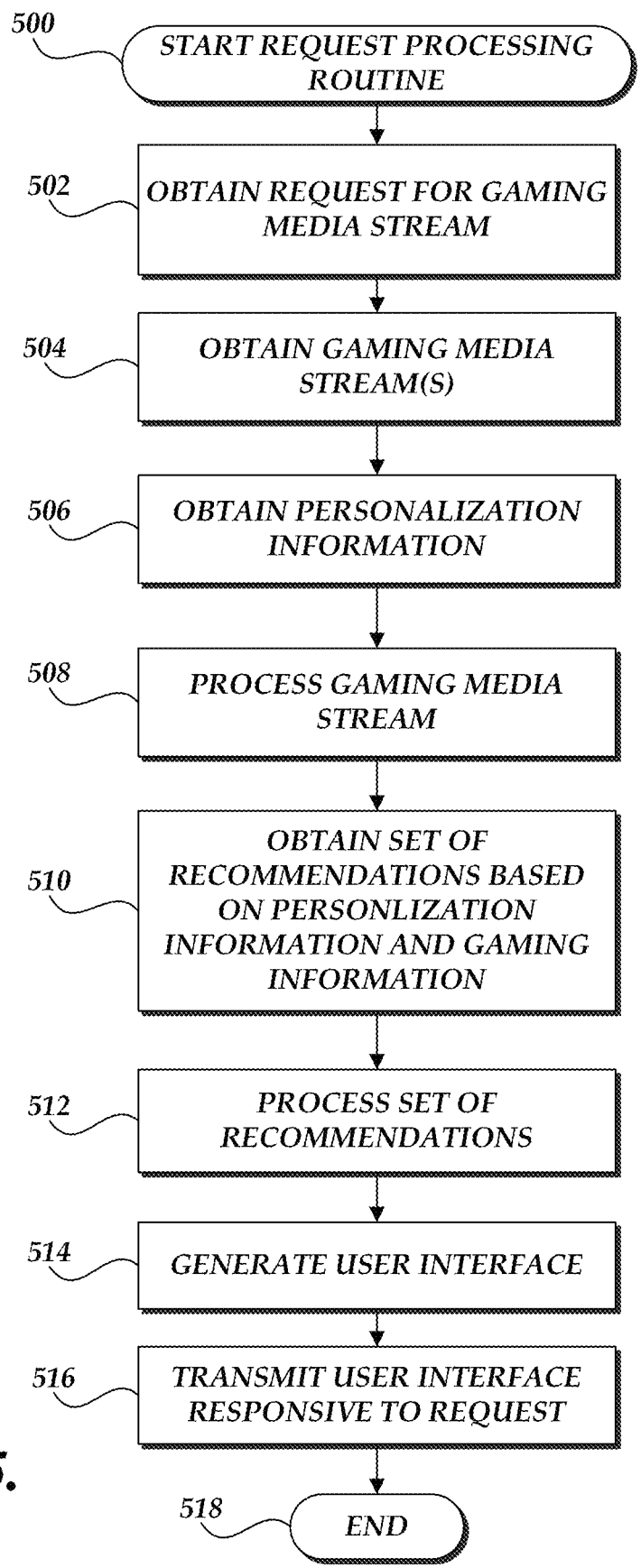
FIG. 5 is a flow diagram illustrative of a gaming media request processing routine implemented by a computing device in accordance with the present application.

FIG. 5 is a flow diagram illustrative of a gaming media request processing routine implemented by a computing device in accordance with the present application. Illustratively, routine 500 may be implemented by the broadcast service 112. Routine 500 illustratively occurs concurrently with the gameplay client 104 and gaming service 114 exchanging interaction data corresponding to the play of one or more games or other interactive activity. As described above, the result of the exchange of gameplay interaction will cause the gaming service 114 to generate one or more gaming media streams that can be broadcast to the gameplay client computing device 104. Additionally, as will be described below, at least some portion of the gaming media stream will be provided (or made accessible) to the broadcast service 112 for transmission to one or more viewing client computing devices 102. For purposes of illustration, routine 500 will be described with regard to singular interaction between a viewing client 102 and a broadcast service 112. Accordingly, broadcast service 112 can repeat at least some portion of routine 500 for each request to generate responsive communications to multiple requesting viewing clients 102.

Illustratively, the gaming media stream provided by the gaming service 114 can include video content for display by a computing device, such as a browser application or other software application. The gaming media stream can also include meta-data that is associated with the presentation of the gaming media. Example of meta data can include timing information regarding the generation of outputs on the client computing device, synchronization information for correlating additional video or audio outputs, presentation information regarding settings or preferences for the video or audio output, control information regarding how the gaming media stream may be manipulated by a computing device or individual user, security and authentication information and the like. Additionally, in one embodiment, the gaming media stream can include information utilized to identify items or events that are or will occur in the gaming media stream, such as the inclusion of specific, unique identifiers corresponding to the items or events. The meta-data can further include additional information regarding the items or events that can be identified in the gaming media stream, such as the duration of the display of the item or event, a weight, priority or importance of the item or other similar information.

At block 502, the broadcast service 112 obtains gaming media requests from one or more viewing client computing devices 102. Illustratively, the viewing client computing devices 102 can utilize one or more interfaces, such as an interface generated on a browser software application, that allows users to request access to gaming media streams. The request can include information identifying the user of the viewing client computing devices 102, such as user identifiers, passwords or other personal information. The request can also include information that identifies the requested gaming media stream, such as identification of general search terms, identification of types of gaming media streams (e.g., an identification of a game), identification of specific instances of a game (e.g., identification of a game and a particular gaming user), identification of particular types of gameplay users independent of game, identification of specific gameplay users independent of game, and the like.

At block 504, the gaming service 114 can provide the broadcast service 112 with or more gaming media streams. In one embodiment, the gaming service 114 can automatically provide the gaming media streams to the broadcast service 112 without specific requests. In another embodiment, the gaming service 114 can provide the gaming media streams based on requests or other triggering criteria associated with the broadcast service 112. For example, the broadcast service 112 can process the request from the viewing client computing devices 102 and generate a gaming identifier request to the gaming service 114. For purposes of the present application, the gaming service 114 provides the gaming stream to the broadcast service 112 in a timing sufficient for processing the gaming stream and including recommendations, as described herein.

At block 506, the broadcast service 112 requests and obtains personalization information from the user information data store 120. The personalization information can include, but is not limited to, information related to previous purchase history for the identified user (e.g., the user of the viewing client computing device 102), previous browsing history information for the identified user, items previously identified or selected for the identified user, ratings or reviews of particular items, or other information related to an identified user and one or more previous interactions with the service provider system 110. The personalization information can further include information related to previous gaming media stream access including, but not limited to an identification of gaming media streams, selection or focus on particular characters or other items depicted in the gaming media stream, tracking a number of times a particular gaming media stream, or portion thereof, has been repeated, saved media clips, and the like. The personalization information can also include social network information related to one or more additional users that are associated with the identified user via a social network, such as social media application or social media networks. The associations can include users or individuals that have a form of designation (e.g., "friends"), tracked interactions, contextual matching, matched keywords or hierarchical browsing nodes (e.g., contextual chats), and the like. Illustratively, the personalization information can include the identification of one or more items that can be recommended to the identified user for selection (e.g., purchase or use) or utilized as seed items for recommending additional items. In one example, an item previously purchased by the identified user can be recommended again if it is available for purchase additional times. In another example, the same item previously purchased by the identified user can be utilized to recommend items complimentary to the purchased item or otherwise contextually related.

At block 508, the broadcast service 112 processes the gaming media streams to obtain additional item or event information. As discussed above, in one embodiment, the broadcast service 112 can process meta-data associated with the gaming media stream to obtain an identification of items or events occurring in the gaming media stream. For example, the broadcast service 112 can process the gaming media stream to obtain unique identifiers included in the gaming media stream meta-data. In another embodiment, the broadcast service 112 can utilize a gaming stream processing component 218 (or other service) to identify the items or events occurring in the gaming media stream. As described above, such a processing component can be trained in accordance with catalog information to facilitate the dynamic identification of items or events. The broadcast service 112 can further utilize additional resources, such as lookup tables or matrices that facilitate the identification of items or events. For example, one or more items may be associated with an event that is dynamically determined. As previously described, the one or more items determined from the gaming media streams can be recommended to the identified user for selection (e.g., purchase or use) or utilized as seed items for recommending additional items.

At block 510, the broadcast service 112 transmits a request and obtains recommendations from the recommendation service 116. In one embodiment, the broadcast service 112 can include an identification of the one or more seed items to find related or associated items, such as the identification of an event or item previously purchased by the identified user. In other embodiments, the broadcast service 112 can also include items that may be utilized as recommendations themselves and request additional items for recommendation. For example, if a particular weapon has been identified in the gaming media stream, the broadcast service 112 can indicate that the weapon will be recommended and request additional or complimentary items (e.g., a feature for increasing speed of the player to better utilize the recommended weapon).

At block 512, the broadcast service 112 processes the set of recommended items. In one aspect, the broadcast service 112 can prioritize items for recommendation based on the source of the recommendation, such as items identified in the gaming media stream compared to items obtained from a social network. In another aspect, the broadcast service 112 can prioritize items that have been identified from multiple sources, such as recommended items generated from personalization information and gaming media information. In a further aspect, the broadcast service 112 can prioritize items based on financial criteria, organizational criteria or other business terms. For example, the broadcast service 112 can prioritize items associated with the game play publisher over third parties. In still another aspect, the broadcast service 112 can prioritize items based on timing information associated with the identified items or events in the gaming media stream. For example, each item can be associated with timing information that identifies a length of time that the recommended item should be identified in the video gaming user interface. The timing can be based on the amount of time that the event or item will appear in the gaming media stream. The timing can be based on additional considerations, such as incentives from the providers of the items or previous selection history. For example, an item that has been selected multiple times by a user may be provided with relatively longer timing information to allow the user the opportunity to eventually select the recommended item. Accordingly, the broadcast service 112 can prioritize recommended items that have shorter timing information or that only occur at specific times in the gaming media stream.

In another aspect, the broadcast service 112 can filter items for recommendation. For example, the broadcast service 112 can filter items that are not associated directly with game play. In another example, the broadcast service 112 can filter items that have been previously recommended but not selected. In a further example, the broadcast service 112 can filter items that have been identified as redundant or duplicative of items associated with the identified user. One skilled in the relevant art will appreciate that a number of additional or alternative processing steps to refine the set of recommended items or sort the set of recommended items can be incorporated by the broadcast service 112.

At block 514, the broadcast service 112 generates, or otherwise causes the generation of, a user interface that includes a requested gaming media stream and one or more recommended items. As previously described, in some embodiments, the broadcast service 112 can generate multiple user interfaces in which individual user interfaces can include the commonly requested gaming media stream and at least one recommended item unique to the individual requesting user (or a grouping of requesting users). At block 516, the broadcast service 112 transmits the results user interface or user interface instructions for processing by the viewing client computing device 102. At block 518, the routine 500 terminates.

Figure 6:
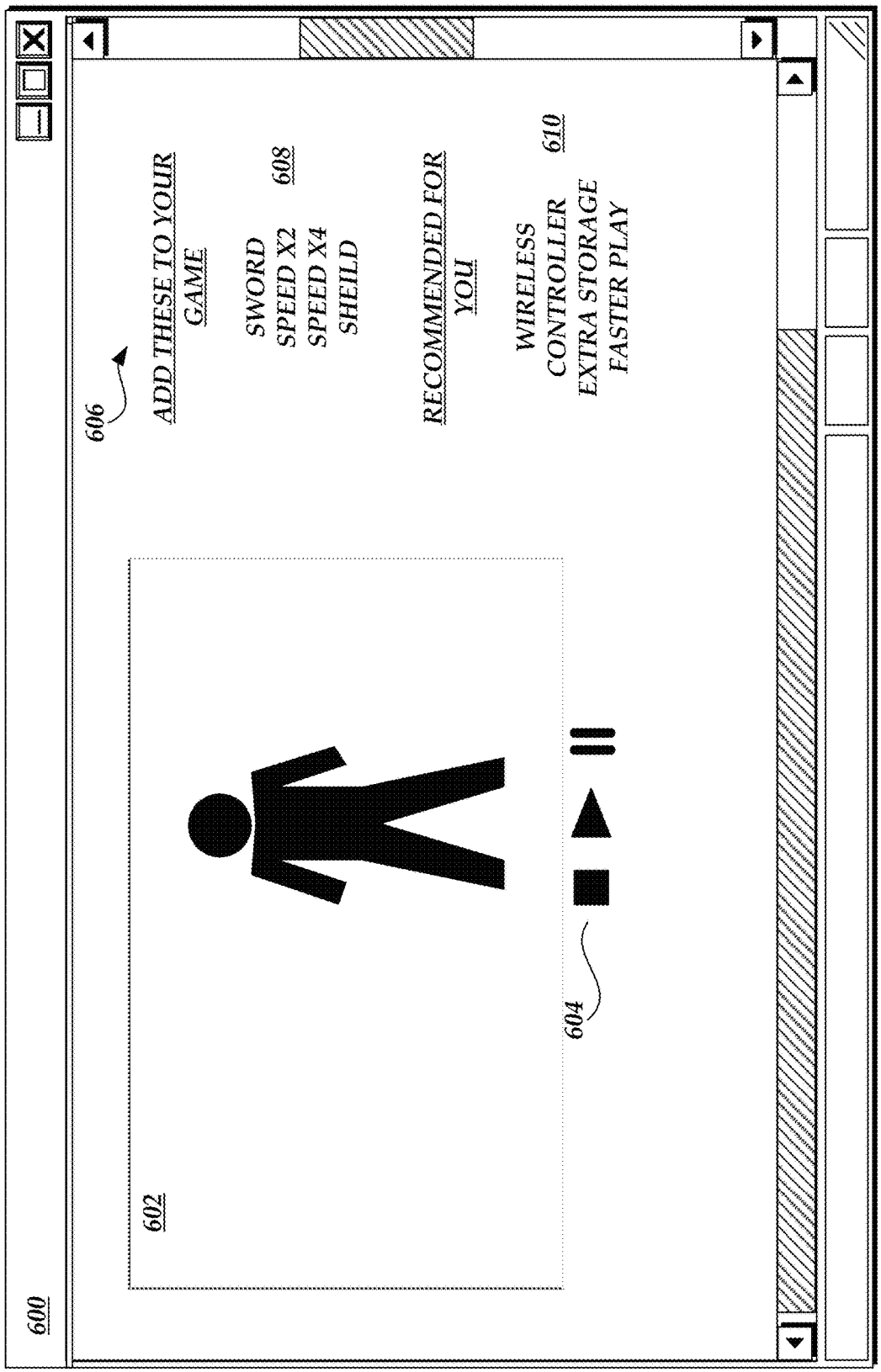
FIG. 6 is a block diagram illustrative of a screen display generated by a computing device in accordance with the present application.

FIG. 6 is a block diagram illustrative of a screen display 600 generated by a computing device in accordance with the present application. The screen display 600 includes a first portion 602 for displaying one or more gaming media streams provided by the broadcast service 112. The screen display 600 further includes control 604 for controlling the playback of the gaming media streams. Illustratively, the screen display 600 can include a second portion 606 for providing recommendations during the playback of gaming media streams. The second portion 606 can includes additional sub-portions, such as sub-portion 608 for recommending items for use in game play and a sub-portion 610 for recommending items in general. One skilled in the relevant art will appreciate that additional or alternative screen displays may also be utilized.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing media stream contextual recommendations comprising:
a gaming service computing device including one or more processors and memory, the gaming service computing device generating one or more gaming media streams corresponding to interaction by a first user with the gaming service computing device, the one or more gaming media streams including video content;
a contextual recommendation service computing device including one or more processors and memory, wherein the contextual recommendation service computing device is configured to:
obtain a request from a second user for a gaming media broadcast,
wherein the request includes a user identifier associated with the second user and a gaming identifier associated with the first user;
obtain personalization information based on the user identifier associated with the second user, wherein the personalization information includes at least one of social network information and historical information;
obtain a gaming media stream corresponding to the gaming identifier, the obtained gaming media stream including video content depicting a plurality of items;
process the video content in the gaming media stream to identify one or more items visually depicted in the gaming media stream;
responsive to identifying the one or more items visually depicted in the gaming media stream and without user input, obtain a set of recommendations based on the identified one or more items visually depicted in the gaming media stream;
filter the set of recommendations based at least in part on the personalization information to generate a final set of recommendations;
generate the gaming media broadcast based on the gaming media stream, the gaming media broadcast including one or more item recommendations from the final set of recommendations; and
provide the gaming media broadcast to the second user.

2. The system as recited in claim 1, wherein the final set of recommendations include timing information for at least one item recommendation in the final set of item recommendations.

3. The system as recited in claim 1, wherein the contextual recommendation service computing device processes the set of recommendations and the personalization information to generate a final set of recommendations by prioritizing recommendations based on the processed gaming media stream.

4. The system as recited in claim 1, wherein the contextual recommendation service computing device filters the set of recommendations to generate a final set of recommendations based at least in part on the identified one or more items.

5. A computer-implemented method for generating contextual recommendations for media streams, comprising:
- obtaining a request from a user to receive a gaming media broadcast, wherein the request is associated with a user identifier and a gaming identifier;
- obtaining a gaming media stream corresponding to the gaming identifier, the obtained gaming media stream including video content depicting a plurality of items;
- processing the video content in the gaming media stream to identify, based at least in part on an identifiable display attribute of one or more items visually depicted in the gaming media stream, the one or more items;
- responsive to identifying the one or more items and without user input, obtaining a first set of recommendations based on the identified one or more items visually depicted in the gaming media stream;
- filtering the first set of recommendations based at least in part on personalization information associated with the user to generate a final set of recommendations; and
- providing a gaming media output based on the gaming media stream and responsive to the request from the user, the gaming media output including one or more item recommendations from the final set of recommendations.

6. The computer-implemented method as recited in claim 5 further comprising obtaining the personalization information based on the user identifier, wherein the personalization information includes at least one of social network information and historical information.

7. The computer-implemented method as recited in claim 6 further comprising obtaining a second set of recommendations based on the personalization information.

8. The computer-implemented method as recited in claim 7, wherein filtering the first set of recommendations to generate a final set of recommendations is based at least in part on the second set of recommendations.

9. The computer-implemented method as recited in claim 8, wherein filtering the first set of recommendations to generate a final set of recommendations includes prioritizing recommendations based on the processed gaming media stream.

10. The computer-implemented method as recited in claim 8, wherein filtering the first set of recommendations to generate a final set of item recommendations includes filtering the final set of item recommendations based on items associated with the gaming media output.

11. The computer-implemented method as recited in claim 5 further comprising:
- obtaining a selection of at least one recommendation from the first set of recommendations; and
- causing a modification of a gaming account associated with the user to incorporate the selected at least one recommendation.

12. The computer-implemented method as recited in claim 5, wherein the one or more item recommendations from the first set of recommendations include timing information based on a length of time that a corresponding item or event appears in the gaming media stream.

13. The computer-implemented method as recited in claim 12, wherein the timing information includes one or more points in time relative to the generation of the gaming media stream in which the one or more item recommendations are valid.

14. The computer-implemented method as recited in claim 12 further comprising prioritizing the first set of recommendations based at least in part on the timing information.

15. The computer-implemented method as recited in claim 5, wherein obtaining the request from the user to receive a gaming media broadcast includes obtaining individual requests from a plurality of users for receiving the gaming media broadcast, wherein providing a gaming media output based on the gaming media stream and responsive to the request from the user includes providing individual gaming media outputs responsive to the individual requests from the plurality of users, and wherein the individual gaming media outputs include one or more item recommendations associated with a respective request.

16. Non-transitory computer-readable media including computer-executable instructions that, when executed by a computing system, cause the computing system to:
- obtain a gaming media stream corresponding to a gaming identifier, the obtained gaming media stream including video content depicting a plurality of items;
- responsive to identifying one or more items visually depicted in a portion of the gaming media stream at least in part by processing video content in the gaming media stream to identify the one or more items based on an identifiable display attribute, and without a user request, obtain a first set of recommendations based on the one or more items;
- filter the first set of recommendations based at least in part on personalization information to identify one or more item recommendations from the first set of recommendations; and
- provide the one or more item recommendations from the first set of recommendations to be included in a gaming media output stream user interface.

17. The non-transitory computer-readable media of claim 16, wherein the computer-executable instructions further cause the computing system to obtain a request for receiving a gaming media broadcast.

18. The non-transitory computer-readable media of claim 16, wherein the computer-executable instructions further cause the computing system to obtain a second set of recommendations based on the personalization information.

19. The non-transitory computer-readable media of claim 18, wherein the computer-executable instructions further cause the computing system to prioritize the second set of recommendations.

20. The non-transitory computer-readable media of claim 19, wherein the computer-executable instructions further cause the computing system to provide the one or more item recommendations as a gaming media stream transmitted to a requesting user, the gaming media stream including one or more item recommendations from the second set of recommendations.

* * * * *